Figure 1:
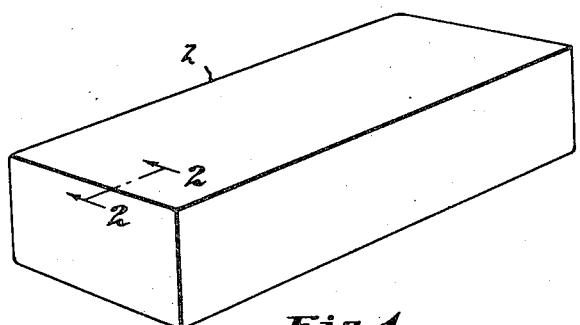

May 4, 1948.  T. A. TE GROTENHUIS ET AL  2,441,090
METHOD OF MAKING A MIX OF CARBON BLACK AND A SYNTHETIC
RUBBERY POLYMER OF A CONJUGATED DIOLEFIN
Filed Feb. 19, 1944

INVENTORS
Theodore A. TeGrotenhuis
Charles B. Frost
BY  Evans & McCoy
ATTORNEYS

Patented May 4, 1948

2,441,090

UNITED STATES PATENT OFFICE 2,441,090

METHOD OF MAKING A MIX OF CARBON BLACK AND A SYNTHETIC RUBBERY POLYMER OF A CONJUGATED DIOLEFIN

Theodore A. Te Grotenhuis, Olmsted Falls, and Charles B. Frost, Akron, Ohio, assignors to The General Tire & Rubber Company, Akron, Ohio, a corporation of Ohio Application February 19, 1944, Serial No. 523,020

4 Claims. (Cl. 260—32)

This invention relates to a method of making rubber-like articles reinforced with finely divided carbon, such for example as carbon black. It particularly relates to a process of compounding aqueous dispersions of rubbery polymerization products, wherein finely divided carbon is incorporated in aqueous rubber dispersions and the material coagulated and masticated.

It has heretofore been proposed to compound natural rubber or dispersions of synthetic rubbers, such as the rubbery copolymers of butadiene with styrene, acrylonitrile, etc., by incorporating in the latex or aqueous dispersions a suitable dispersion of carbon black and/or other compounding agents. The latex thus compounded may be utilized for the preparation of unmasticated rubberlike articles, such as dipped goods and the like. However, in such unmasticated rubbers, the carbon black serves merely as a filler and coloring medium.

For the preparation of articles reinforced by carbon black, it has heretofore been proposed to dry the coagulum thus obtained in the same manner as the rubbery polymer is dried in conventional practice and to masticate the dried coagulum thus obtained on a suitable mill or Banbury mixer to cause breakdown and plasticization of the rubber and intimate dispersion of the particles of the black throughout the mass thereof. The incorporation of the black in the latex permits much faster breakdown of the rubbery polymer when the dried coagulum is subjected to mastication.

The uniformity and degree of dispersion of the black in the rubber and the physical properties of the rubber articles produced are usually as good as the conventional mill mixed rubber. This is believed to be due to the fact that addition of a coagulant to the compounded aqueous dispersion, in addition to causing agglomeration of the rubbery particles, also causes agglomeration of the pigment particles so that relatively large agglomerates of pigments are dispersed within the rubbery mass. The dispersion of hard agglomerates in such a rubbery mass is very difficult and it is sometimes almost impossible to accomplish, probably because the breakdown of the rubber occurs so rapidly that the plasticity of the rubbery material is insufficient to shear the relatively hard black agglomerates.

To overcome the formation of these agglomerates, attempts have been made to improve the quality and stability of the pigment dispersion by use of relatively larger quantities of dispersing agent, such as long chain polyglycerides, sulfolignins, condensation products of formaldehydes and naphthalene sulfonic acids, tannins such as quebracho, and the like. While the use of larger quantities of these materials apparently acts to reduce the number of lumps or granules of visible pigment agglomerates below the number present when a carbon black slurry without dispersing agent or with smaller quantities of dispersing agent is used, the relatively smaller agglomerates apparently remain. This is evidenced by the fact that physical properties of the rubber produced are oftentimes inferior to those obtainable by the conventional mill mixing processes.

It is therefore an object of the present invention to provide a method of processing natural or artificial rubbery polymerization products wherein one or more pigments, such for example as carbon black, are incorporated in the latex prior to coagulation and mastication treatments. This method provides a rubber mix which, when vulcanized, has properties at least equivalent to those of rubbers prepared in conventional manner, wherein the dry black is incorporated in the solid mass of broken-down rubber in the mill or Banbury mixer.

It is another object of the present invention to provide a method of processing rubber or producing rubber articles wherein carbon black is incorporated in the aqueous dispersion of the rubbery polymer, and wherein completely mixed rubber batches are produced in but a fraction of the time and power required according to conventional mixing procedures.

It is a further object of the present invention to produce from compounded aqueous dispersions of rubber or rubber-like polymerization products articles having the rubber reinforced by finely divided carbon and having physical properties at least as desirable as those obtained by conventional mixing procedures.

It is a still further object of the present invention to produce rubber articles reinforced with finely divided carbon black wherein the carbon black is incorporated in the aqueous dispersion of rubberlike material and wherein a dispersing agent is not required.

We have found that these and other objects, as will be apparent from the following description of the invention, are accomplished by incorporating in any suitable way carbon black in a dispersion of rubberlike material in any immiscible liquid, such for example as water, to obtain a relatively uniform fluid mixture; coagulating the rubberlike material to entrap the carbon black in intimate mixture with the coagulum of rubberlike material; and then subjecting the coagulum while still retaining a substantial amount of moisture to a shearing action. This shearing action is such as that obtainable by passing the coagulum one or more times through squeeze rolls of a rubber mill or calender.

The retention in the coagulum passed through squeeze rolls of a substantial amount of a liquid, such as water or moisture and especially a liquid which is a non-solvent and which is immiscible with the rubber, evidently greatly facilitates the breaking up of the fine invisible agglomerates as well as the relatively large particles of carbon black. Therefore, the rubber articles produced from the mixture obtained have properties at least equal to and generally superior to those obtained by the conventional mill mixing procedures. In addition, the mixtures may be produced with the required plasticity in as little as one-half the time required for conventional mill mixing.

The carbon black may be incorporated in the latex in any convenient way known to provide a relatively uniform mix. If dilution of the aqueous dispersion of rubber with relatively large quantities of water is not undesirable, the black may be incorporated as a slurry in water or other liquid miscible with the latex and not a coagulant therefor, without a dispersing agent, with or without previous colloid mill or equivalent treatment. If dilution of the latex or aqueous dispersion is to be kept at a minimum and the use of a dispersing agent in substantial quantities is not objectionable from the economic viewpoint, the black may be prepared in the form of a dispersion by passing a water-black slurry containing a dispersing agent through suitable dispersing apparatus to obtain a dispersion in accordance with conventional latex technology. If a dispersing agent is incorporated in the latex and if a powdered (non-beaded) black is utilized, the black may be simply stirred into the latex mixture and dispersed therethrough by stirring or other suitable agitation of the latex-black mix.

Coagulation of the relatively fluid latex-black mixture may be accomplished in any suitable manner, as by the addition of an electrolyte, such as a salt and/or acidic material. To facilitate washing, coagulation is preferably accomplished according to methods by which a crumb of moderate size is obtained. Thus, a crumb may be obtained, as is well-known in the art, by adding a salt solution to the latexlike mixture in sufficient amount to render the mix unstable.

In the ordinary synthetic rubber plants, coagulation is accomplished by mixing the latex with a substantial quantity of salt solution under conditions of turbulence, and thereafter incorporating acidic material, such as sulfuric or acetic acid to change soap to fatty acid. This method or any other method may be used in accordance with our process.

In accordance with conventional procedure, as evidenced by the Government specifications in the synthetic rubber industry, the coagulated rubber, which may be in either crumb or pellet-like form, is subjected to a drying operation to reduce volatile matter, including moisture, to a minimum value. Thus, the specifications of the Government-owned GR–S plants require the drying of the rubbery polymer to an extent such that the maximum volatile matter present is .75% of the rubber. In practice, the volatile matter content (volatile matter capable of being driven off by heating below temperatures destructive to the rubbery hydrocarbon) is reduced much below this figure.

We have discovered that the ease of dispersion by mastication of carbon black in a coagulated mix of elastomer (or rubberlike material) and black is related to the moisture, or volatile matter content including moisture, of the rubber-black mix. In accordance with the present invention, the rubber-black mixture is subjected to the afore-mentioned shearing or wet smearing operation while the volatile matter content including moisture is sufficient to permit dispersion of the particles of black by a few passes through mill rolls or the equivalent, as compared to the many passes heretofore required. The volatile content should generally be above 1% of the rubber content and preferably above 2% of the total of rubber and black, although as little as 0.75 or even .5%, based on the rubber has a noticeable effect on physical properties of the rubber. The shearing or smearing operation is most effective to cause dispersion of the black after coagulation and any time before the volatile content is reduced below 5% of the rubber. While water is particularly effective in facilitating the dispersion of the black or the breaking of agglomerates thereof, other liquids, preferably those of the higher boiling type (less volatility) and which are immiscible or insoluble in water, may be used to give some of the advantages obtainable by moisture. Examples of these are softening agents, such as pine tar, high boiling point esters such as dibutyl phthalates, water-insoluble higher alcohols including decanol, duodecanol, etc., polyglycerols, polyhydric alcohol esters such as glycol and glycerol esters, which preferably are immiscible with water and may be added in emulsion form. The relatively wet rubber-black mixture may be passed through suitable squeeze or shearing rolls as soon as possible after the washing water has been drained from their surfaces.

The shearing of the black in the rubber to cause disruption of the agglomerated pigment or to retain the pigment in dispersed form may be accomplished in a number of different ways. We have found, however, that at least one or two passes between rolls such as those of a rubber mill or calender, which preferably rotate at different speeds, are most effective in disrupting the wet agglomerates. When the coagulum is sufficiently dry, smooth rolls may be provided. However, when the coagulum is relatively wet, rolls having a knurled or corrugated surface to compress the rubbery polymer into a sheet are desirable. A single pass through the relatively tight-fitting rolls is usually sufficient to provide the desired dispersion and to permit the attainment of properties commensurate with those of rubber produced by usual procedures. If desired, however, the crumb or coagulum may be dried to about 2 to 10% moisture or volatile matter including moisture, packaged or baled in the usual manner, and thereafter subjected to shearing action on a mill or Banbury mixer. This latter procedure permits the shearing step to be accomplished at great distances from the point where the aqueous dispersion of rubber and black is coagulated.

The afore-mentioned treatment is particularly applicable to the processing of synthetic rubbers, such as rubbery copolymers produced by polymerizing a material comprising a major proportion of a butadiene, preferably having six carbons or less and conjugated double bonds including butadiene-1,3, 2,3 dimethyl butadiene 1,3, chloroprene, 2,3 dichlorobutadiene 1,3, with a minor proportion of one or more resin-forming materials containing at least one unsaturated group. Examples of such resin-forming materials are styrene, acrylonitrile, acrylates, vinyl pyridine, dimethyl vinyl ethinyl carbinol (dm. v. e. c.), allyl chloride, methallyl chloride, and other unsaturated chlorides, or mixtures containing any one or more of these or equivalent materials in minor proportion. The process is also applicable to the polymers of butadiene, isoprene, chloroprene or rubbers containing a major proportion of one or more of these materials or other dienes which are polymerizable to rubbery polymers. It is also applicable to rubbers formed by condensation procedures, such as linear polyhydric alcohol-dibasic acid condensation products.

The following examples illustrate the present invention:

Example 1

|  | Parts |
|---|---|
| Carbon black (W-6) | 45 |
| Water | 450 |
| 25% GR–S latex | 400 |

The carbon black and water were mixed together; the fluid and unstable mixture, while being retained under constant agitation to maintain distribution of the beaded black, was passed through a Charlotte-type colloid mill to obtain a relatively stable slurry. The slurry thus obtained was mixed with the latex and the mixture poured into a suitable coagulant, such as a highly agitated solution of salt and acetic acid, to coagulate the rubber in the form of crumbs having a maximum dimension of about one-eighth inch or so. The crumbs thus prepared were filtered and washed in relatively clean water for a period of one-half hour. The washed crumbs were thoroughly drained so that the moisture content was between 5 and 20%. The crumbs were then passed through corrugated rolls to form a thick sheet, which sheet was then passed once between rubber mill rolls which had different peripheral speeds and which were spaced about one-sixteenth inch or less apart to obtain a thin sheet. This thin sheet was then dried to about .5% of volatile matter. The dried rubber thus obtained was without any further mastication compounded according to a standard formula, cured for about fifty minutes at 287° F. The rubber obtained had a tensile strength of about 3,100 pounds per square inch and an elongation of about 600%. The rubber showed an entire absence of visible agglomerates, indicating a relatively good dispersion.

Example 2

When in the previous example the crumbs were dried according to conventional procedures to meet GR–S specifications of less than .75% volatile matter and the mixture then compounded on a rubber mill to the same formula, the tensile strength of the cured rubber was only about 2,200 pounds per square inch and the rubber showed a very large number of visible agglomerates or pieces of black.

Example 3

When in Example 1 the washed crumbs were dried to about 2% moisture, based on the rubbery polymer plus the black, and the mixture then compounded in the usual manner, substantially the same results were obtained as indicated in Example 1. Like Example 1, the mixing and compounding was completed in but half the time required for conventional mixing procedures and great savings in power required were obtained. In addition, the compounded mixture processed much more readily than mixtures compounded in the conventional manner.

Example 4

|  | Parts |
|---|---|
| Carbon black (W-6) | 45 |
| Water | 150 |
| 25% GR–S latex | 400 |
| Dispersing agent (condensation product of formaldehyde and naphthalene sulfonic acid) | 10 |

The dispersion prepared by passing the black, water and dispersing agent through a colloid mill was stirred with the latex. The mixture thus obtained was coagulated, washed, dried and compounded as in Example 2. Vulcanized rubber test strips produced therefrom showed a tensile strength of but 1,800 pounds per square inch and an elongation of about 600% after curing for the same length of time as in Examples 1 and 2. A freshly cut surface of the rubber showed few visible agglomerates, the number being somewhat less than in the case of the rubber of Example 2.

Example 5

When the crumbs in Example 4, after washing, were passed through squeeze rolls, as in Examples 1 or 3, the tensile strength of the articles produced from rubber compounded according to the same formula was 2,900 pounds per square inch and the cuts in the rubber showed no visible evidence of agglomerates. Because of the improvement in properties over that of the rubber of Example 4, it was our opinion that the relatively small, invisible agglomerates must have been reduced, accounting for the difference in properties.

Example 6

|  | Parts |
|---|---|
| Carbon black (W-6) | 45 |
| Water | 200 |
| 25% GR–S latex | 400 |
| Dispersing agent (sodium lignin sulfonate) | 10 |

The carbon black, water and dispersing agent were passed through the colloid mill and incorporated in the latex, as in Example 4. The rubber-black mixture thus obtained was coagulated, washed and dried as in Example 1 to about 5% moisture and then given our wet smearing treatment by compounding in a Banbury mixer. The tensile strength of the rubber produced was 2,900 pounds per square inch and the dispersion showed substantially entire absence of agglomerates.

Example 7

When one-half part of sodium lauryl sulfate was added to the water of Example 1 prior to the formation of the aqueous slurry, and the slurry incorporated in the latex, coagulated, and the coagulum dried as in Example 2, the resulting compounded rubber appeared to have somewhat fewer visible particles than were present in the rubber of Example 2. The number was considerably greater than in Example 1, however.

The preparation of a slurry is facilitated when .5 part or other suitable amount of a wetting agent, such as one of those set forth in the list starting on page 127 of "Industrial and Engineering Chemistry," vol. 35, No. 1, January 1943, or in the list starting on page 17 of "Industrial and Engineering Chemistry," vol. 33, No. 1, January 1941, is incorporated in the water of Example 6 prior to formation of a carbon black-water slurry.

Any of the desired types of finely divided carbon, such as lamp black, channel black, furnace black, gas black, etc., may be used in preparing the rubber compounds of the present invention. The amount of black used is preferably sufficient to cause improvement in properties of rubbery polymers, such improved properties being characterized by reinforcement, i. e., increase in tensile strength, stiffening of the polymer, and/or increased resistance of the rubbery material to abrasion. In the case of thermoplastic resins or resinous materials capable of being masticated, to which the present invention also applies, only sufficient carbon black need be present to provide the desirable color. By the afore-mentioned moist or wet smearing or shearing action, superior dispersion and greater efficiency of the use of the black usually results.

In rubbery polymers such as rubbers of the "Buna" type or in natural rubber latices, the black usually amounts from 25 to 50 or 60 parts of black for each 100 parts of the rubbery material of the latex. Larger amounts may be used, however, and it is sometimes preferable to prepare the rubber-carbon black mixture in masterbatch form, containing say 100 parts or so of black for each 100 parts of rubberlike material, and thereafter mix therewith a suitable amount of rubbery material to obtain the desired black content.

The following examples illustrates the above masterbatch procedure.

*Example 8*

| | Parts |
|---|---|
| Carbon black (Binney & Smith W-6 powder) | 110 |
| Water | 550 |
| Purified sodium lignin sulfonate | 10 |
| 25% GR-S latex | 400 |

The above ingredients were mixed, coagulated, dried to 2-5% moisture content and given a shearing treatment by passing through mill rolls, all as in Example 1, to obtain a carbon black GR-S masterbatch having the carbon black dispersed throughout the rubbery material. A separate batch of GR-S latex was mixed with the desired amounts of a dispersion of zinc oxide, sulfur and rubber softener and also coagulated, dried to 2-5% moisture. A sufficient amount of the carbon black masterbatch and other desired materials was then combined on a mill with the required amount of the other rubbery mix to give proportions corresponding to a standard test formula. The rubber after curing for fifty minutes at 287° F. had a tensile strength of about 3,200 pounds per square inch and an elongation of about 600%. A freshly cut surface of the rubber showed an entire absence of visible agglomerates.

In the above examples, the carbon black may be substituted by other types of finely divided carbon, such as lamp black, etc. as desired. The dispersing agents and wetting agents may be substituted by other dispersing agents and wetting agents known to those skilled in the art, e. g., any of those in the aforementioned lists and compatible with the latex. The GR-S latex may be substituted by dispersions of resinous materials, including natural rubber, polymers and copolymers, as afore-mentioned, mixtures of any one or more of these materials, dispersions of black within the rubber or polymer being produced with but a fraction of the power and time required for conventional mixing procedures.

In the practice of the present invention, since the synthetic rubber-producing factories are located at substantial distances from rubber-processing factories where apparatus for subjecting the rubber-black mixture to a shearing treatment is available, it is frequently desirable in the practice of the present invention to simply dry or squeeze the rubber-black mixture to say 2-5% or 10% or more of moisture or volatile content and to bale or box the thus treated material for shipment to the processing factories. Thus, the rubber-black coagulum in crumb or pellet like form, preferably after partial drying to about 2% to about 5% volatile matter or moisture, may be boxed or baled so that all or a substantial proportion of the moisture content remains.

Figure 2:
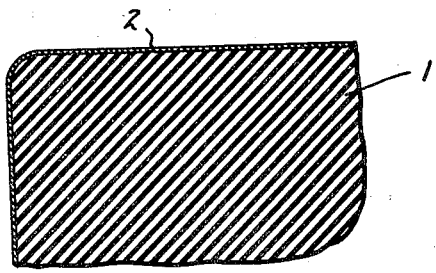

In the drawing, Figure 1 illustrates a package of such partially dried rubber-black coagulum, which may or may not contain additional compounding ingredients. Figure 2 is an enlarged sectional view on the line 2—2 of Figure 1. The substantially unmasticated rubberlike material 1, having carbon black or other finely divided carbon, preferably in excess of 20% (based on the rubber, distributed therethrough and containing at least 1% or preferably at least 2% volatile matter, based on the total of rubber and black, is preferably in compressed or bale form, so that tendency for loss of its moisture content is reduced to a minimum. A suitable moisture-proof covering of any material known to impede transfer of moisture, such for example as Cellophane, asphalt, wax-paper, oil-treated paper, asphalt-coated cloth, paper, fibrous material, woven material, or other suitable material 2, is preferably disposed around the mix 1 to further decrease tendency for loss of volatile matter prior to use.

By processing rubbers in accordance with the present invention, the output of the masticating machinery is increased from 30 to 60% and, in addition, the mixture has superior processing properties, particularly when the amount of black exceeds 25 or 30% of the rubbery polymer. Thus, the mixes produced in accordance with the present invention also have the advantage of tubing much more readily to form articles of the desired shape, such as treads and the like. In addition, the presence of moisture, as aforementioned, seems to improve the curing properties of the rubbery material.

Although the principles of the invention have been illustrated by giving examples of the introduction of carbon black as the filler, it is understood that the invention also comprehends the introduction of other materials that tend to smear while in a wet state, such as clays, silica, whiting, sulfur, powdered vulcanizing agents, emulsions of oils, softeners, etc.

While the present invention is primarily applicable to the compounding of vulcanizable rubber latices or latices of vulcanizable elastomers, such latices may be substituted by latices (dispersions in any liquid immiscible with or not a solvent for said elastomers) of other elastomers or mixtures thereof coming within this generic term. As set forth in the article entitled "Nomenclature of synthetic rubbers," by Harry L. Fisher, vol. 100, No. 6, page 27, India Rubber World, September 1, 1939, the vulcanizable elastomers include elastoprenes, mixtures of these or their latices with elastolenes, elastothiomers, copolymers of the elastoprene monomers, and plastomers or elastolene monomers, with one or more of the monomeric materials adapted to form elastoplastics, etc. It is also applicable to the preparation of dispersions of black in elastoplastics and plastomers.

It is to be understood that variations and modifications of the specific processes herein shown and described for purposes of illustration may be made without departing from the spirit of the invention.

In the claims, the term "rubbery polymerization product" is intended to designate materials having resilience or springiness generally characteristic of natural rubber, neoprene, Buna rubbers, etc. It includes natural rubber which is considered to be a polymer of isoprene. The term "carbon black" is used in its generic sense to include carbon black of the various types, no matter how manufactured.

What we claim is:

1. A process of producing a dispersion of carbon black in a synthetic rubbery elastomer prepared by polymerizing in aqueous emulsion a material containing as a predominant polymerizable ingredient a conjugated diolefin having less than seven carbon atoms, which comprises preparing a slurry of said carbon black and water, mixing said slurry with an aqueous dispersion of said rubber elastomer to form a mixture, coagulating solids of said mixture, straining at least a major portion of liquid from said solids, washing said separated solids with water and obtaining an unmasticated, washed coagulum, having said carbon black distributed through the rubbery mass, and shearing said coagulum between surfaces movable relative thereto while free of drainable liquid to cause break-up of carbon black agglomerates before they are hardened by reducing the moisture content of said mass below .5%, based on the weight of said rubbery elastomer and said carbon black, whereby a rubbery elastomer substantially free from visible carbon black agglomerates is produced.

2. A process for producing a dispersion of carbon black in a synthetic rubbery elastomer prepared by polymerizing in aqueous emulsion a material containing as a predominant polymerizable ingredient a conjugated diolefin having less than seven carbon atoms, which comprises preparing a slurry of said carbon black and water, mixing said slurry with an aqueous dispersion of said rubbery elastomer to form a mixture, coagulating solids of said mixture, straining at least a major portion of liquid from said solids and obtaining an unmasticated coagulum having said carbon black distributed through the rubbery mass, and shearing said coagulum between surfaces movable relative thereto while free of drainable liquid to cause breakup of carbon black agglomerates before they are hardened by reducing the moisture content of said mass below 1%, based on the weight of said rubbery elastomer and said carbon black, whereby a rubbery elastomer substantially free from visible carbon black agglomerates is produced.

3. A process for producing a dispersion of carbon black in a synthetic rubbery elastomer prepared by polymerizing in aqueous emulsion a material containing as a predominant polymerizable ingredient a conjugated diolefin having less than seven carbon atoms, which comprises preparing a slurry of said carbon black and water, mixing said slurry with an aqueous dispersion of said rubbery elastomer to form a mixture, coagulating solids of said mixture, straining at least a major portion of liquid from said solids, washing said separated solids with water and obtaining an unmasticated washed coagulum having said carbon black distributed through the rubbery mass, and shearing said coagulum between surfaces movable relative thereto while free of drainable liquid to cause breakup of carbon black agglomerates before they are hardened by reducing the moisture content of said mass below 2%, based on the weight of said rubbery elastomer and said carbon black, whereby a rubbery elastomer substantially free from visible carbon black agglomerates is produced.

4. A process for producing a dispersion of carbon black in a synthetic rubber elastomer prepared by copolymerizing in aqueous emulsion butadiene-1,3 and styrene, which comprises preparing a slurry of said carbon black and water, mixing said slurry with an aqueous dispersion of said rubbery elastomer to form a mixture, coagulating solids of said mixture, straining at least a major portion of liquid from said solids, washing said separated solids and obtaining an unmasticated washed coagulum having said carbon black distributed through the rubbery mass, and shearing said coagulum between surfaces movable relative thereto while free of drainable liquid to cause breakup of carbon black agglomerates before they are hardened by reducing the moisture content of said mass below 1%, based on the weight of said rubbery elastomer and said carbon black, whereby a rubbery elastomer substantially free from visible carbon black agglomerates is produced.

THEODORE A. TE GROTENHUIS.
CHARLES B. FROST.

REFERENCES CITED

The following references are of record in the file of this patent:

UNITED STATES PATENTS

| Number | Name | Date |
| --- | --- | --- |
| 1,610,226 | Cohen | Dec. 14, 1926 |
| 1,611,278 | Peterson | Dec. 21, 1926 |
| 1,846,820 | Darling et al. | Feb. 23, 1932 |
| 1,991,367 | Beck et al. | Feb. 19, 1935 |
| 2,354,424 | Novotny | July 25, 1944 |

OTHER REFERENCES

Pages 724 to 727, Industrial & Eng. Chemistry, Aug. 1944.